United States Patent [19]

Mackey, Sr. et al.

[11] 4,027,992
[45] June 7, 1977

[54] BORING TOOL GUIDE DEVICE

[76] Inventors: Bruce A. Mackey, Sr., 2730 E. Bonniebrook, Waukegan, Ill. 60085; Bruce A. Mackey, Jr., 2-120B Chevy Chase, Mundelein, Ill. 60060

[22] Filed: Nov. 17, 1975

[21] Appl. No.: 632,646

[52] U.S. Cl. .............................. 408/97; 408/112; 81/5.1 R; 269/87.3

[51] Int. Cl.² ........................................ B23B 49/00

[58] Field of Search ............ 408/110, 112, 115, 72, 408/97, 103, 108; 81/5.1, 367–380, 418, 420, 425 R; 269/87.3

[56] References Cited

UNITED STATES PATENTS

| | | | |
|---|---|---|---|
| 1,212,634 | 1/1917 | Hathaway | 408/112 X |
| 1,346,235 | 7/1920 | Muller | 408/112 |
| 2,915,926 | 12/1959 | Woerner | 408/115 |
| 3,386,318 | 6/1968 | Pekarcik et al. | 408/97 |
| 3,540,322 | 11/1970 | Swanson | 408/112 |

FOREIGN PATENTS OR APPLICATIONS

| | | | |
|---|---|---|---|
| 566,845 | 1/1945 | United Kingdom | 408/112 |

*Primary Examiner*—Gil Weidenfeld
*Attorney, Agent, or Firm*—Dominik, Knechtel, Godula & Demeur

[57] ABSTRACT

A boring tool guide device is disclosed in which there is included a standardized power source connector suitable for coupling with a moving power source, a boring tool, surfaces to mate with jigs and fixtures, a pre-set depth control spacer, and yieldable means for automatic retraction of the boring tool from the work piece.

10 Claims, 8 Drawing Figures

BORING TOOL GUIDE DEVICE

BACKGROUND OF THE INVENTION

In the fabrication of mass produced articles requiring assembly of various parts, it is necessary to spot, bore, drill, ream, and countersink great numbers of holes with repeatability and accuracy. Frequently such operations must be performed in thin sections of fiberglass, steel, copper, aluminum, or in metal or plastic tubing. Positioning of these operations is facilitated through the use of specially designed jigs and fixtures, which are frequently equipped with bushings of a diameter appropriate to the tool performing the operation intended at each location. Different tools, often having different diameters must be chucked into the power source, which renders the power source and its operator unproductive during tool changeover. Insertion and withdrawal of the tool from the jig or fixture causes wear of both the tool and the bushing, causing lack of reproducibility and accuracy of the operation, replacement of tools and bushings, scrap and downtime.

SUMMARY OF THE INVENTION

The present invention relates to a device which can be included into the jig or fixture at each location where it is necessary to spot, bore, drill, ream or countersink. It can be used only at one such location and thus remain in the jig or fixture, where it is to be used in mating relationship with the jig or fixture for potentially longterm accuracy and reproducibility.

The device includes a speed fit connector, or driver, a cutter shank having cutting surfaces and a restraining shoulder on one end and means for coupling the shank to the speed fit driver. Also included is a body portion with surfaces that mate, engage, and interlock with a jig or fixture. Interior of the body are incorporated yieldable means for automatic retraction of the tool from the work piece when the power source is withdrawn and means for depth limitation.

The speed fit driver is designed for removable mating connection to a spindle chuck adapter. The adapter is intended to stay with the power source and is suitable for retention by a common electric power drill chuck. The combination of the speed fit driver and spindle chuck adapter is designed such that the power source need not be adjusted to the diameter of the tool and so that the rotation of the power source need not even be stopped to effect engagement with the tool. This permits the power source to be rapidly moved from one work site on the jig or fixture to another without stopping the power source, loosening of a chuck, removal and storage of a tool, selection of the next tool, insertion of the new tool, tightening of the chuck, and acceleration of the power source.

Accordingly, it is an object of the invention to provide a device that can be included in jigs and fixtures to increase productivity by decreasing downtime.

It is another object of the invention to improve the accuracy and reproducibility of such operations as spotting, drilling, boring, reaming or countersinking in connection with the use of jigs and fixtures.

A further object of the invention is to permit the power source used in spotting, drilling, boring, reaming or countersinking to be moved from one work site on a jig or fixture to another without changing tools or stopping the powered motion.

Another object of the invention is to permit preset depth limitation in such operations.

A related object of the invention is to provide for automatic retraction of the tool from the workpiece immediately upon termination of cutting at each work site in the jig or fixture.

Also an object of the invention is the saving of bushings in jigs and fixtures and the replacement of tools because of wear between bushings and tools.

An allied object is to reduce scrap caused by improper tool selection, inaccurate tool placement, improper depth of work and the like.

DESCRIPTION OF DRAWINGS

Other objects and advantages will become apparent upon reading the following detailed description and upon reference to the drawings in which.

While the invention will be described in connection with a preferred embodiment, it must be understood that said description is not intended to limit the invention to that embodiment. On the contrary, the description should be deemed to cover all alternatives, modifications and equivalents as may be included within the spirit and scope of the invention as defined by the claims hereinafter recited.

DESCRIPTION OF THE PREFERRED EMBODIMENT

Figure 1:
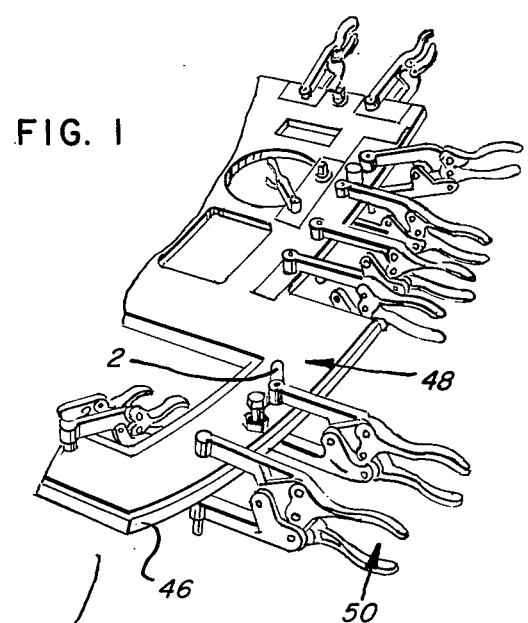
FIG. 1 is a fragmentary perspective view of a template type fixture employing clamp supports for the invention in a complex pattern.
Figure 2:
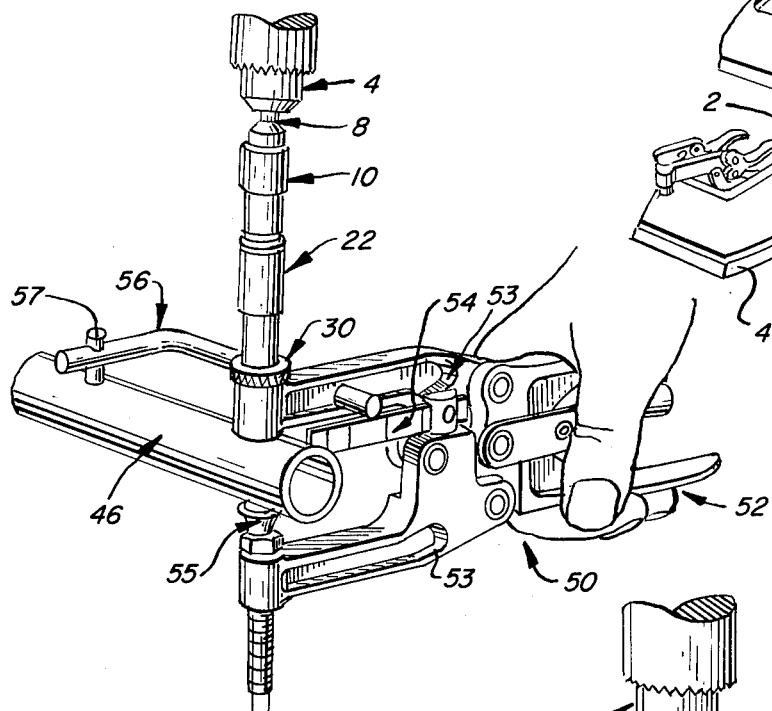
FIG. 2 is a perspective view of the invention incorporated with a hand held clamp support having positioning aids for use in boring materials having a circular or annular cross section of small diameter.
Figure 3:
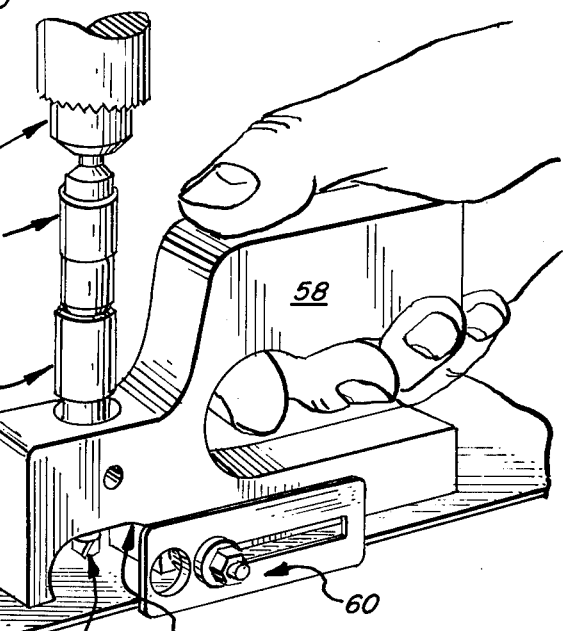
FIG. 3 is a perspective view showing the invention in use with an alternative hand held positioning device on a flat surface.
Figure 4:
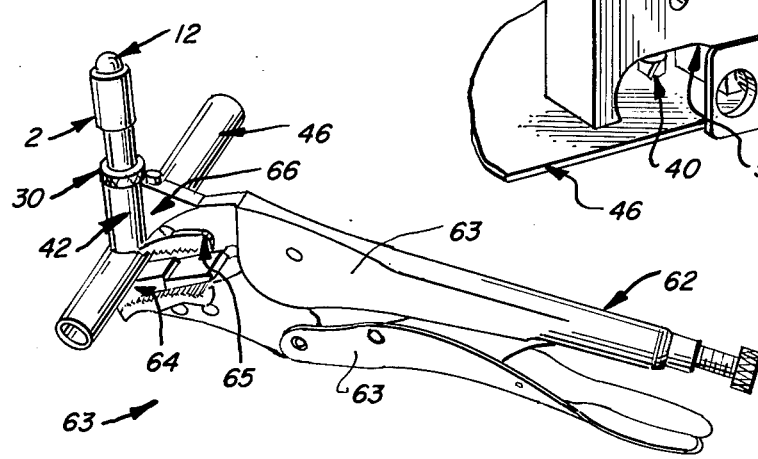
FIG. 4 is a perspective view disclosing the invention in use with a modification of a well known commercially available clamping device suitable for use with a variety of small diameter tubes, pipes or rods.

The versatility of the boring tool guide 2 is illustrated in FIGS. 1 through 4 inclusive of the drawings. Unlike many drill fixtures or guides, the subject invention may be applied to a variety of clamps, and hand positioned for use. One particularly vexatious drilling job is involved in drilling conduit or tubing such as when installing a TV antenna on a roof. The guide 2 may, as shown in FIG. 4, be secured to a gripper 62 making a well aligned hole through the work piece tubing 46. An alternative clamp 50 with a depth spacer 54 is shown in FIG. 2 for greater stability. The positioner 58 of FIG. 3 further highlights the versitility of the guide 2 where drilling through a thin sheet workpiece 46.

FIGS. 1 through 4 detail the jigged configurations in which the guide 2 may be used. Specifically, FIG. 1 shows a template type fixture employing clamp supports for the guide 2 in a complex pattern, and utilizing numerous positions. The work piece 46 is shown beneath the template 48 with a number of hand held clamps 50 positioned thereon. The guide 2 is inserted into and fixedly secured to the top arm of the hand held clamp 50.

FIG. 2. discloses the use of a device in a hand held clamp 52 comprising opposed jaws 53 having an adjustable anvil 55, handles 52, and is specially equipped with an adjustable depth spacer 54 and hole spacer arm 56. By positioning the spacer arm stylus 57 on the center of the tube, and the depth spacer end on the tube, good alignment is insured for boring at any location along a tube of the same diameter. Also shown are the spindle chuck 4, the spindle chuck adapter shank 8, the spindle chuck adapter 10, the depth control spacer and shield 22, and guide boss 30.

Turning now to FIG. 3, the guide 2 is shown in use with a hand held positioner 58, having a visibility recess 59, and equipped with an edge bracket 60 for use with a thin cross-section flat work piece 46. Other visible features include the spindle chuck 4, the spindle chuck adapter 10, the depth control spacer and shield 22, and cutting surfaces 40.

Further as seen in FIG. 4, the guide 2 is pictured with a modified form of a hand-held gripper 62, including gripper handles 63, gripper jaws 65, and utilizing a gripper saddle 64, to hold a circular work piece 46. The hand-held gripper 62 is modified for use with the invention 2, by the addition of a guide bracket 66. In this view, the speed fit drive connector 12 and guide body boss 30, are visible on the boring tool guide device 2.

Figure 5:
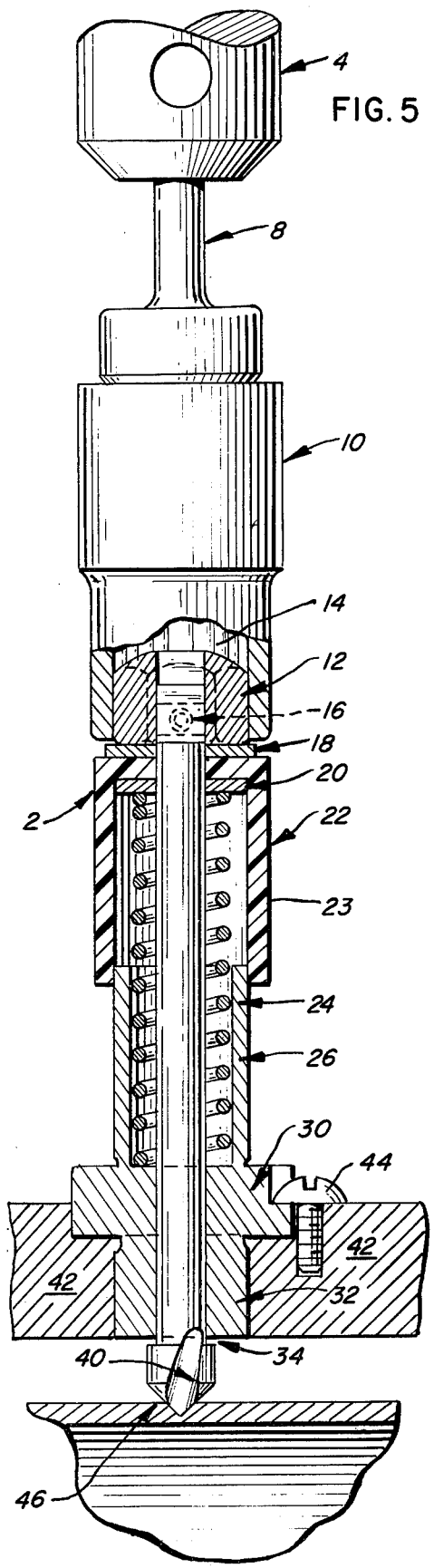
FIG. 5 is a partially broken front elevation view illustrating the invention held by the jaws of a spindle chuck and boring into a work piece, with the interior construction disclosed by partial sectioning.

The boring tool guide device is generally indicated by numeral 2 in FIG. 5. It is connected to and driven by a power source spindle chuck 4, whose jaws grip and rotate the spindle chuck adapter 10, by means of the adapter shank 8. The spindle chuck adapter 10 is removably attached to the boring tool guide device 2 by snapping over a speed set drive connector 12 in the manner of a socket wrench. Both rotational force and downward pressure are then transmitted through elements of the invention hereinafter described to the cutting surfaces 40 of the boring tool to penetrate the work piece 46.

Immediately adjacent to the cutting surfaces 40 is a retaining shoulder 34 which limits the upward retraction because of the thrust of the yieldable means 24 mounted interiorly of the unit. Thus the cutting surfaces 40, upon retraction, are poised for reentry into the work piece beneath the arbor 32.

The arbor 32 and guide body boss 30 are inserted into a jig or fixture 42 for accurate placement of the tool on the work piece. The arbor 32, guide body boss 30, and guide body 26 are held stationary and thus prevented from rotating with the cutting surfaces 40 by a retainer screw 44.

The depth control spacer and shield 22 is preferably formed of an annealed nylon or low friction teflon. The cylindrical skirt 23 serves to shield the spring or yieldable means 24, and also to guide the washer 20. Optionally, a lubricating port can be provided in the skirt 23 to lubricate and relieve pneumatic pressure. The depth control spaces and shield 22 normally do not rotate in operation, and because of the yielding of the plastic skirt 23, initial misalignment is corrected.

Figure 6:
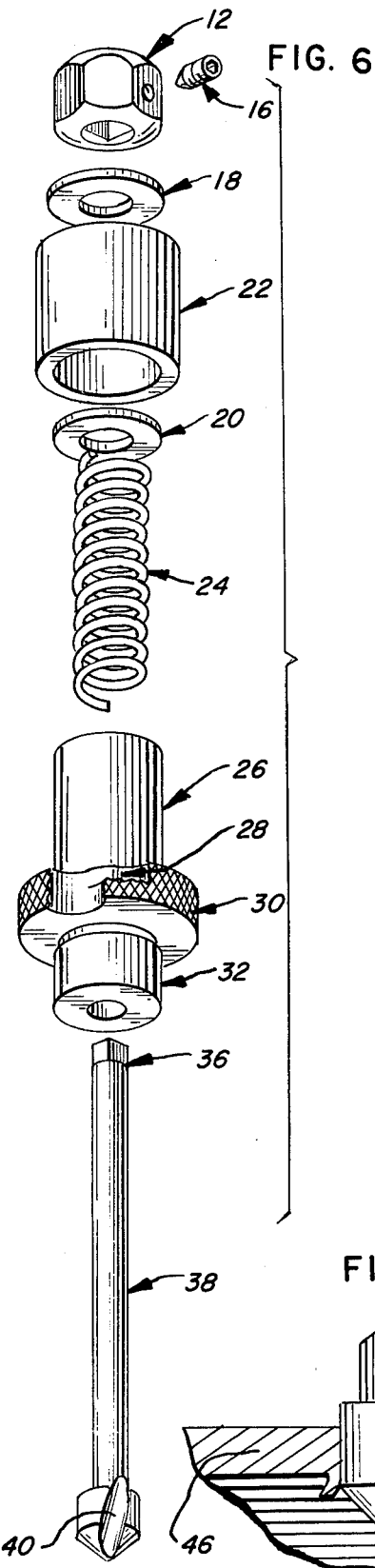
FIG. 6 is an exploded perspective view of the invention, less the spindle chuck adapter, showing the assembly of the parts and their interrelationship.
Figure 7:
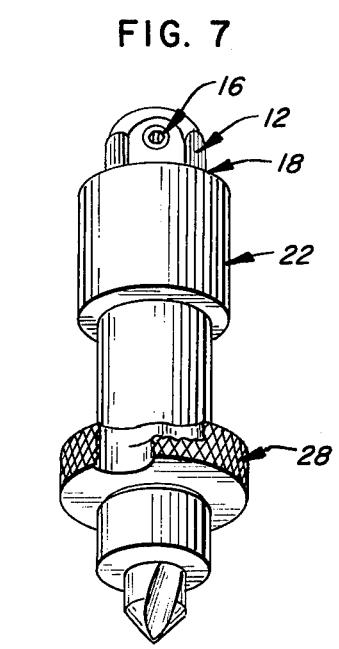
FIG. 7 is a vertical perspective view of the assembled invention illustrated in FIG. 6, again less the spindle chuck adapter.

Turning now to FIGS. 6 and 7, the speed fit drive connector incorporates a plurality of flat, adjacent peripheral surfaces corresponding to equivalent adapter interior flats 14 as shown in FIG. 5. The upper surface of the speed set drive connector 12, adjacent to the plurality of peripheral flat surfaces, is rounded to permit engagement of the spindle chuck adapter 10 while the spindle chuck adapter is rotating and the speed fit drive connector 12 is stationary. Fixedly secured to the speed set drive connector 12 is the cutter shank 38 having one or more flat surfaces 36 machined in its extremity remote from the cutting surfaces 40. The flat surfaces are inserted into a complementary recess in the base of the speed set drive connector 12. Thus, the flats 36 do the driving. The set screw 16 engages the flat surface 36 of the cutter shank 38 to hold the same against axial displacement. Optionally, an offset roll pin and notch in a corner defined by the flat faces may be substituted for the set screw.

The cutter shank is inserted through axial apertures in the arbor 32, guide body boss 30, guide body 26, yieldable means 24, thrust washer 20, depth control spaces and shield 22, and washer 18.

The guide body boss 30 is equipped with a retainer groove 28 to prevent rotation of the arbor 32, the guide body boss 30, and the guide body 26, when said retainer groove 28 engages and interlocks with a retainer screw 44 shown in FIG. 5. The yieldable means 24 is compressed by the downward force of the power source spindle chuck 4 shown in FIG. 5 allowing the cutting surfaces 40 to penetrate into the work piece 46.

Figure 8:
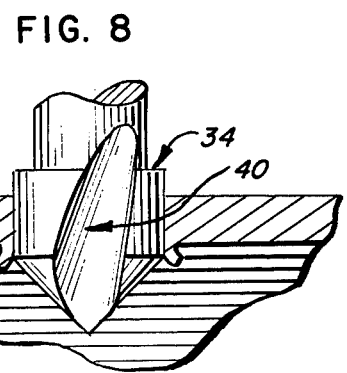
FIG. 8 is an enlarged fragmentary view of the cutting surfaces of the boring tool penetrating a work piece.

Turning now to FIG. 8, the cutting surfaces 40 are shown having penetrated the work piece 46. The restraining shoulder 34 is also disclosed. It is at the point of breakout, as shown, that the action of the spring serves to retard the breakthrough and thus reduce the tendency to chip, burr, and peel. The load or resistance of the spring 24 increases as the cutting surface 40 is advanced. Thus, at the point of breakthrough the chip load is made uniform, and bending or burring of the chip is reduced. Also, the spring dampens vibrations and harmonics encountered when drilling thin surfaces. Therefore, the guide 2 not only provides for versatility in positioning, but also for cleaner drilling.

Also to be noted is single flute 41 defining the cutting surface 40. This provides a point 43 at the end of the cutting surface 40 at the center of the cutting element. This further permits grinding the point with conical relief. The stability then comes from the support of the shank 38 rather than the heel of the conventional twist drill. Additionally, the spring 24 tends to eliminate lost motion thus imparting further stability to the guide device 2.

Although particular embodiments of the invention have been shown and described in full here, there is no intention to thereby limit the invention to the details of such embodiments. On the contrary, the intention is to cover all modifications, alternatives, embodiments, usages and equivalents of a BORING TOOL GUIDE DEVICE as fall within the spirit and scope of the invention, specification and the appended claims.

What is claimed is:

1. A boring tool guide device comprising in combination;
    a spindle chuck adapter, a speed fit driver, a cutter shank having a cutter at one end and means for coupling the shank to the speed fit driver at the other end, a guide body, said guide body including a base portion having an axial bore and a tubular portion extending axially from said base portion and being substantially coaxial with said bore, said guide body having retainer means to secure the guide body to a work fixture, a tubular shaped depth control spacer having an end wall and an axial aperture therein, said control spacer being in telescoping engagement with said tubular portion, said control spacer having means for limiting the distance that the tubular portion of the guide body can be telescoped therein, resilient means received within said tubular portion and said control spacer to bias the control spacer and the guide body axially apart, said cutter shank being guidingly received in the axial bore of said guide body and the cutter and speed fit driver extending beyond the guide body and control spacer respectively, whereby said retainer means can be secured to said work fixture and rotatable driven power means can be removably secured to the speed fit driver to axially feed the cutter along its axis into a workpiece with the maximum depth of penetration being determined by said limiting means.

2. In the device of claim 1, wherein said limiting means includes at least one thrust washer received within said depth control spacer.

3. In the device of claim 1, wherein at least one washer is located on the exterior of said end wall of control spacer and concentric with the cutter shaft.

4. In the device of claim 1, wherein said retainer means comprises a boss having a retainer groove.

5. In the device of claim 1, wherein said cutter includes a single flute concentric point cutting edge.

6. A boring tool guide and positioning device comprising; clamping means having opposed jaws, said boring tool device being secured in one of said jaws substantially perpendicular to the surface of a work piece engaged by said clamping means, a cutter shank having a cutter at one end and means for connecting the shank to drive means at the other end, a guide body, said guide body including a base portion having an axial bore, and a tubular portion extending axially from said base portion and being substantially coaxial with said bore, a tubular shaped depth control spacer having a end wall and an axial aperture therein, said control spacer being in telescoping engagement with said tubular portion, said control spacer having means for limiting the distance that the tubular portion of the guide body can be telescoped therein, resilient means received within said tubular portion and control spacer to bias the control spacer and the guide body axially apart, said cutter shank being guidingly received in the axial bore of said guide and the cutter and the connecting means extending beyond the guide body and control spacer respectively, whereby said clamping means can be secured to the work piece and said drive means can be removably secured to said connecting means to axially feed the cutter along its axis into said workpiece with the maximum depth of penetration being determined by said limiting means.

7. In the boring tool guide and positioning device of claim 6, wherein alignment means are associated with the clamping means for positioning the cutter at a desired location on the surface of a circular work piece received between the jaws of said clamping means.

8. In the boring tool guide and positioning device of claim 6, wherein said clamping means have yieldably urged toggle means coupled to said jaws to removably secure the same to said work piece.

9. In the boring tool guide and positioning device of claim 6, an aligning guide comprising a flat elongate member; and means securing the flat elongate member with one flat surface adjacent one of said jaws and parallel to the axis of the boring shank.

10. In the device of claim 6, wherein said cutter includes a single flute concentric point cutting edge.

* * * * *